US009670878B2

(12) United States Patent
Cazuc et al.

(10) Patent No.: US 9,670,878 B2
(45) Date of Patent: Jun. 6, 2017

(54) CELLULAR ACOUSTIC STRUCTURE FOR A TURBOJET ENGINE AND TURBOJET ENGINE INCORPORATING AT LEAST ONE SUCH STRUCTURE

(71) Applicant: AIRCELLE, Gonfreville l'Orcher (FR)

(72) Inventors: Xavier Cazuc, Le Havre Rouelles (FR); Jean-Philippe Joret, Beuzeville (FR)

(73) Assignee: AIRCELLE, Gonfreville l'Orcher (FR)

( * ) Notice: Subject to any disclaimer, the term of this patent is extended or adjusted under 35 U.S.C. 154(b) by 394 days.

(21) Appl. No.: 14/322,601

(22) Filed: Jul. 2, 2014

(65) Prior Publication Data
US 2014/0341744 A1    Nov. 20, 2014

(30) Foreign Application Priority Data
Jan. 4, 2012   (FR) ...................................... 12 50073

(51) Int. Cl.
*F01D 25/24* (2006.01)
*F02K 1/82* (2006.01)
*F01D 9/04* (2006.01)

(52) U.S. Cl.
CPC .............. *F02K 1/827* (2013.01); *F01D 9/041* (2013.01); *F05D 2260/96* (2013.01); *F05D 2260/963* (2013.01); *Y02T 50/672* (2013.01); *Y02T 50/673* (2013.01)

(58) Field of Classification Search
CPC ... F01D 5/26; F01D 9/02; F01D 9/041; F05D 2260/96; F05D 2260/963; F02K 1/827
See application file for complete search history.

(56) References Cited

U.S. PATENT DOCUMENTS

| 3,948,346 A | * | 4/1976 | Schindler .................. E04B 1/86 181/286 |
| 4,257,998 A | | 3/1981 | Diepenbrock, Jr. et al. |
| 4,298,090 A | * | 11/1981 | Chapman .................. F02C 7/24 181/286 |
| 5,782,082 A | * | 7/1998 | Hogeboom ............. F02C 7/045 181/213 |
| 7,018,172 B2 | * | 3/2006 | Prasad ...................... F01D 5/16 415/119 |

(Continued)

FOREIGN PATENT DOCUMENTS

| EP | 1 336 739 A2 | 8/2003 |
| FR | 2 201 401 A1 | 4/1974 |
| WO | 2011/034469 A1 | 3/2011 |

OTHER PUBLICATIONS

International Search Report issued Apr. 25, 2013 in International Application No. PCT/FR2012/053094.

*Primary Examiner* — Ninh H Nguyen
(74) *Attorney, Agent, or Firm* — Burris Law, PLLC

(57) ABSTRACT

A cellular acoustic structure for a turbojet engine includes a closed wall. The closed wall includes at least two faces having acoustically transparent areas and acoustic reflective areas. The closed wall is filled with a plurality of cells, and the acoustic reflective areas are disposed within the closed wall so that an acoustic path of aerial sound vibrations travels through the acoustically transparent areas, penetrates inside the cells and reflects on the acoustic reflective areas. In particular, the acoustic path in some of the cells has a depth greater than a half of the thickness of the cellular acoustic structure.

7 Claims, 2 Drawing Sheets

(56) References Cited

U.S. PATENT DOCUMENTS

| | | | | |
|---|---|---|---|---|
| 7,540,354 B2 * | 6/2009 | Morin | ............... | F02C 7/045 |
| | | | | 181/286 |
| 7,607,287 B2 * | 10/2009 | Reba | ............... | F01D 9/02 |
| | | | | 415/115 |
| 7,921,966 B2 * | 4/2011 | Chiou | ............... | G10K 11/168 |
| | | | | 181/214 |

* cited by examiner

CELLULAR ACOUSTIC STRUCTURE FOR A TURBOJET ENGINE AND TURBOJET ENGINE INCORPORATING AT LEAST ONE SUCH STRUCTURE

CROSS-REFERENCE TO RELATED APPLICATIONS

This application is a continuation of International Application No. PCT/FR2012/053094, filed on Dec. 28, 2012, which claims the benefit of FR 12/50073, filed on Jan. 4, 2012. The disclosures of the above applications are incorporated herein by reference.

FIELD

The present disclosure relates to a cellular acoustic structure for a turbojet engine. It also relates to a turbojet engine incorporating at least one such structure.

BACKGROUND

The statements in this section merely provide background information related to the present disclosure and may not constitute prior art.

The double-flow turbojet engines have a first envelope and a second envelope, one inside the other, limiting respectively a pressurized cold flow which is established between the first and second envelopes and a hot flow which is established inside the second envelope. The cold flow is most often generated by a fan disposed at the inlet of the jet engine. The hot airflow is composed from a portion of the cold air having passed through the fan and by the combustion gases of at least one combustion chamber disposed inside the second envelope which drives a turbine, the shaft of which drives the fan.

In propulsion mode, the two flows come together at the nozzle outlet.

In thrust reverse mode, by a mechanism that is not implemented in the context of the present disclosure, a more or less high fraction of the cold flow is returned upstream of the turbojet engine, thus applying a thrust in the reverse direction of the jet engine advance.

As a result, the cold flow has turbulences which it is important not to increase or even to reduce on one hand, and the propagation of the acoustic noises resulting therefrom must be filtered as much as possible.

In the state of the art, it is known to make mechanical structures, such as panels and crossbars, in form of cellular composites, each cell behaving substantially as a Helmholtz resonator.

The present disclosure relates to the improvement of the acoustic absorption characteristics of the structures that are located in the air flow of an aircraft nacelle, such as radial splitters, but also others.

Conventionally, such structures are formed by panels of cells ("honeycombs"), covered with an aerodynamic outer skin drilled with holes allowing to form Helmholtz resonators, having an acoustic attenuation effect.

By nature, these structures must have a small thickness, in order to limit the aerodynamic impact on the air flow.

Thus, when seeking to improve the acoustic performances of these structures, it is not possible to increase the depth of the cells without damaging the aerodynamic performances.

SUMMARY

The present disclosure provides a cellular acoustic structure, in particular for a turbojet engine, including:

a closed wall comprising at least two faces including acoustically transparent areas, this wall being filled with a plurality of cells, and acoustic reflection means, disposed within said closed wall so that the acoustic path of the aerial sound vibrations travelling through said acoustically transparent areas, penetrating inside said cells and reflecting on said acoustic reflection means, has in at least some of said cells a depth greater than half the thickness of said structure.

According to other characteristics, taken alone or in combination:

the cellular acoustic structure includes two levels of cellular material separated by a median porous septum and an outer skin alternating acoustically transparent areas and acoustically reflective areas, disposed so as an acoustically reflective area on one face of the outer skin faces an acoustically transparent area on the opposite face of the outer skin;

the cellular acoustic structure includes a single level of cellular material and an outer skin alternating acoustically transparent areas and acoustically reflective areas, disposed so as an acoustically reflective area on a first face faces an acoustically transparent area on a second face of the outer skin;

the cellular acoustic structure includes two levels of cellular material separated by a median porous septum, an acoustically transparent outer skin and a plate including a plurality of acoustically reflective inclined facets, connected by edges so that the acoustic paths formed through the two levels of cellular material and the porous septum are of varying heights along the section of the structure.

The present disclosure also relates to a turbojet engine incorporating at least one such cellular acoustic structure.

According to other characteristics, taken alone or in combination:

the cellular acoustic structure is provided with an airfoil to make a radial separator between a first envelope and a second envelope delimiting a cold flow;

the cellular acoustic structure is provided with an airfoil to make at least one flow-straightening vane for a turbine generating cold flow propelled between a first envelope and a second envelope.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
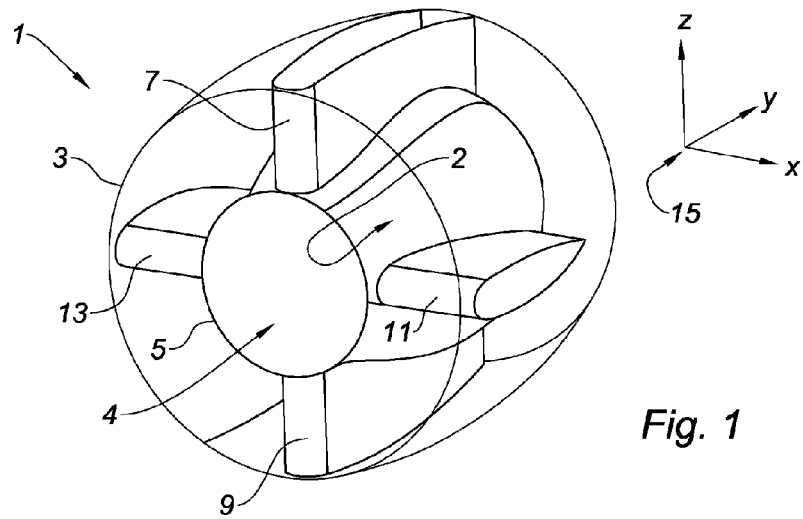
FIG. 1 is a perspective view of a turbojet engine of the type of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In FIG. 1, there is shown a perspective view of a turbojet engine incorporating an air stream separation structure. The turbojet engine 1 includes a first envelope 3 and a second envelope 5 which respectively delimit a cold flow 2 established between the first and second envelopes, and a hot flow 4 within the second envelope 5. The direct trihedral (xyz) 15 of the drawing of FIG. 1 is directed downstream of the turbojet engine, with the y-axis according to the orientation of the propulsive thrust of the turbojet engine.

The cold flow is composed of the air sucked by a fan (not shown) upstream of the jet engine 1. The fan is itself driven by the shaft of a turbine (not shown) disposed downstream of the turbojet engine and inside the second envelope 5. In order to drive the turbine, a fraction of the cold air flow is extracted for a combustion chamber (not shown), disposed in relation with the second envelope 5 and combustion gases of which drive the turbine before ejecting through a nozzle (not shown) downstream, where they mix with the propulsion cold flow.

In this arrangement, the first 3 and second 5 envelopes carry aerodynamic structures which may generate strong acoustic noises. The arrangement of cellular acoustic structures, aerodynamically profiled here, is known in the relating art. Four structures are available in two different types:

two bifurcations, called "6H" (for "6 hours") and 9 "12H" (for "12 hours") 7, directed along the z-axis of the direct trihedral 15, vertically to the drawing; and
  two radial separators, called "beam splitters" 11 and 13, directed along the x-axis of the direct trihedral 15, horizontally to the drawing.

The two radial separators 11 and 13 are each made of a cellular acoustic structure which, furthermore, is formed according to an airfoil adapted to the separation of the cold flow at this level of the turbojet engine.

Figure 2:
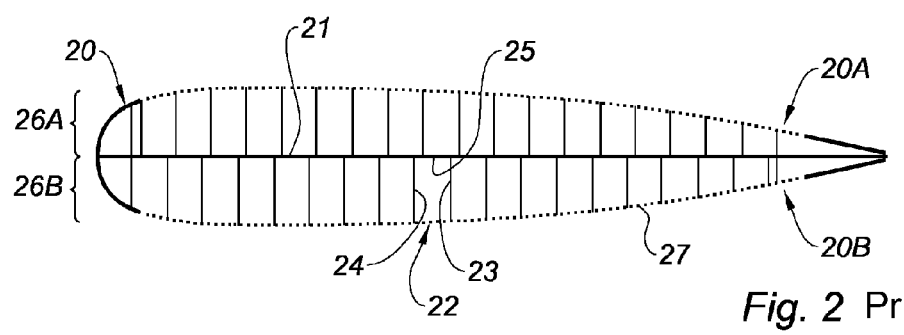
FIG. 2 is a schematic sectional view of an air stream separation structure according to the state of the art.

In FIG. 2, there is shown a schematic sectional view of a cellular acoustic structure, airfoil of which allows to use it as an air stream separation structure (beam splitter).

The cellular acoustic structure of the relating art includes a closed wall 20 or skin, having two opposite faces 20A and 20B in one section. The skin is acoustically transparent, that is to say, it is likely to let aerial sound vibrations pass in both directions.

This skin may be made from several folds of glass (2 or 3, typically), polymerized then micro-perforated (with holes with a diameter ranging from 0.2 to 0.5 mm, typically).

In one form, the skin is acoustically transparent because it is drilled, on its entire surface of the opposite faces 20A and 20B, with holes of porosity determined according to the mechanical strength constraints and transmission constraints of the incident acoustic energy inside the cellular acoustic structure.

The volume enclosed between the two faces 20A and 20B is filled with a cellular material in the middle of which is mounted a massive central plate 21 which tends to reflect the sound waves that are attempting to cross it. The central plate 21 separates the cells in a first level of the cellular material such as the cell 26 which opens onto the face 20A and the cells of a second level of a cellular material such as the cell 27 which opens onto the face 20B.

Each cell is composed, in the cut of the section shown in FIG. 2, of two massive side walls 23 and 24. The opening of the cell 22 directed upwardly in FIG. 2 is closed by the massive central plate 21, while the opening of the cell 22 directed downwardly in FIG. 2 is closed by the face 20B of the acoustically transparent skin 20. The sound waves which are reflected by the massive central plate 21 are strongly attenuated by the massive side walls 23 and 24 of the cell 22, and only a fraction of the incident acoustic energy is reflected out of the cellular acoustic structure. The whole is known as an acoustic filtering cell with a single degree of freedom "SDOF".

In order to increase the acoustic filtering gain of such a cellular acoustic structure, we have to increase its thickness or the distance between the two faces 20A and 20B of the skin 20. However, when this cellular acoustic structure is profiled according to aerodynamic characteristics as to make a radial separator (beam splitter) for a turbojet engine, it is not possible to increase this thickness to improve its acoustic performances.

Figure 3:
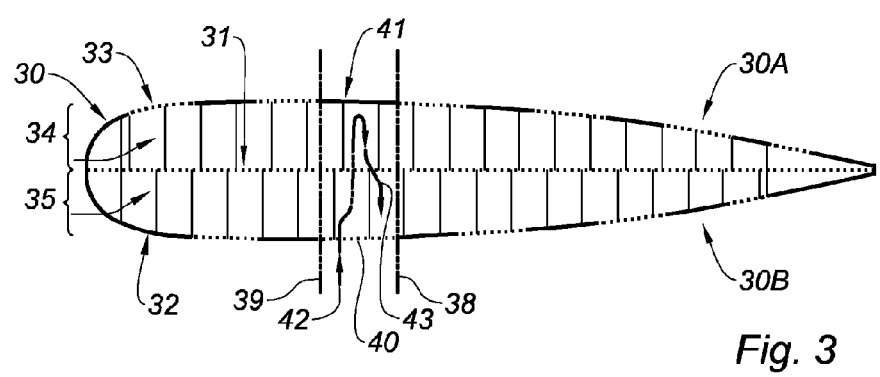
FIG. 3 is a schematic sectional view of a first form of a cellular acoustic structure for a turbojet engine according to the present disclosure.

In FIG. 3, there is shown a schematic sectional view of a first form of a cellular acoustic structure for a turbojet engine according to the present disclosure.

The cellular acoustic structure of the first form of the present disclosure includes a closed wall 30 or skin, having two faces 30A and 30B in one section. The skin is composed of an alternation of acoustically transparent areas, that is to say it is likely to let aerial sound vibrations pass in both directions, and of massive areas reflecting the aerial sound vibrations in both directions. The two levels 34 and 35 of cells, taken from the cellular acoustic structure of the state of art, are not separated by a massive central plate as in the state of art (FIG. 2), but by a porous septum 31 likely to let the aerial sound vibration pass in both directions.

Thus, compared to the acoustic path of an incident sound wave substantially normal to the faces 30A and 30B, the alternation of the skin 30 areas allows to oppose an acoustically transparent area, such as the area 33, to a massive area, such as the area 32, and further, the massive area 41 to an acoustically transparent area 40. The result is that an incident sound wave 42 on the face 30B, penetrates inside the first level 35 of the cellular material, travels through the porous septum 31, travels through the second level 34 of cells, reflects on the massive area 41 of the face 30A, travels through the second level 34 of cells, the porous septum 31, and the first level 35 of cells, to emerge as a reflected wave 43 strongly weakened.

Note that the beginning and end of facing alternate areas, such as the acoustically transparent area 40 and the massive area 41, are aligned according to the normal 38 and 39 to the porous septum 31. The geometric distribution of the alternate areas of the skin 30 is determined depending on the desired acoustic response of the cellular acoustic structure once in place in the turbojet engine. It is then determined by the construction of the cellular acoustic structure. Similarly, the distribution of the acoustic areas of the outer skin, transparent or reflective, is determined relative to the distribution of the cells in the two levels 34 and 35 of cellular material.

This distribution of means for combining the different cells on at least a portion of the acoustic path of the first form of the present disclosure allows to fully use the thickness (that is to say the dimension of the cellular acoustic structure measured in the direction perpendicular to the septum 31, or parallel to the Z-direction of FIG. 1 when this structure is a radial separator or "beam splitter" such as 11 or 13) of the cellular acoustic structure, although it is profiled according to aerodynamic criteria which vary the thickness along the section and which prevent the increase of this thickness for acoustic filtering reasons. Since the sound path uses the two levels 34 and 35 of cells, the whole is qualified as acoustic filtering cell with two degrees of freedom "DDOF".

Figure 4:
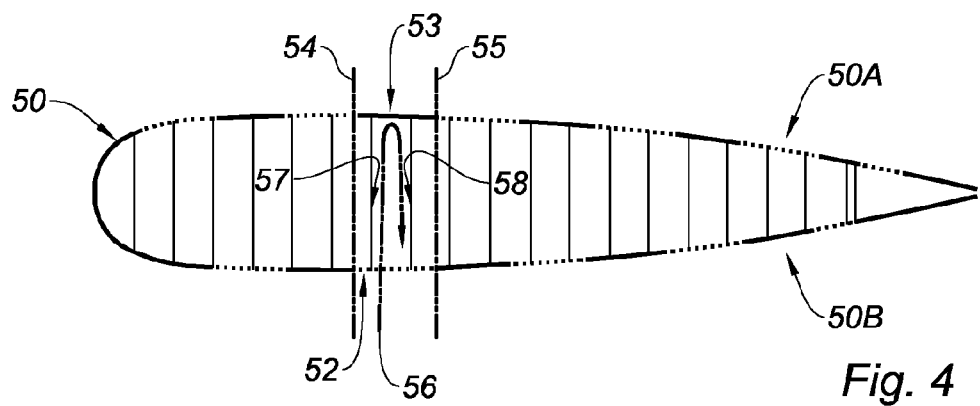
FIG. 4 is a schematic sectional view of a second form of a cellular acoustic structure for a turbojet engine according to the present disclosure.

In FIG. 4, there is shown a schematic sectional view of a second form of a cellular acoustic structure for a turbojet engine according to the present disclosure.

The cellular acoustic structure of the second form of the present disclosure includes a closed wall 50 or skin, having two faces 50A and 50B in the section shown in FIG. 4. The skin is composed of an alternation of acoustically transparent areas, that is to say, likely to let the aerial sound vibrations pass in both directions, and of massive areas reflecting the aerial sound vibrations in both directions, as in the first form of the present disclosure (see FIG. 3).

But, unlike the first form, the cellular acoustic structure of the second form includes only one level of cells (or of cellular material) so that there is no central separation. Thus, between the alternate areas 52 and 53, delimited in the section of the structure by the normal to the median plane 54 and 55, is established an acoustic path 56 of full-thickness of the acoustic structure between the side walls 57 and 58 of each cell. The same kind of acoustic path is repeated according to the alternation of acoustically transparent areas and reflective areas of the outer skin 50 from the top (face 50A) downwards (face 50B) or in the reverse direction. The whole is qualified as acoustic filtering cell with one degree of freedom "SDOF".

Figure 5:
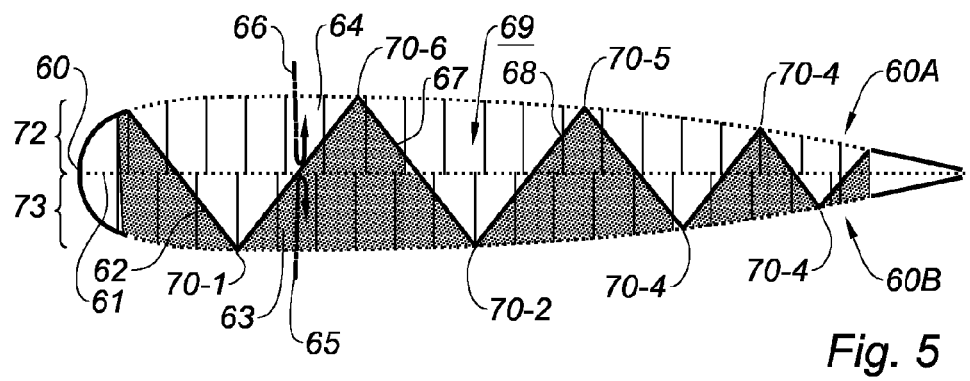
FIG. 5 is a schematic sectional view of a third form of a cellular acoustic structure for a turbojet engine according to the present disclosure.

In FIG. 5, there is shown a schematic sectional view of a third form of a cellular acoustic structure for a turbojet engine according to the present disclosure.

The cellular acoustic structure of the third form of the present disclosure includes a closed wall 60 or skin, having two faces 60A and 60B in one section. The skin is acoustically transparent on at least the two opposite faces 60A and 60B of the outer skin 60, that is to say, it is likely to let the aerial sound vibrations pass in both directions. The two levels 64 and 65 of cells, taken from the cellular acoustic structure of the state of art, are not separated by a massive central plate as in the state of art (FIG. 2), but by a porous septum 61 likely to let the aerial sound vibration pass in both directions, as in the first form (FIG. 3).

In order to combine the different cells on at least a portion of the acoustic path so as to fully use the thickness of the cellular acoustic structure, the third form includes a plate 62 including a plurality of facets. The edges 70-1 to 70-6 of the plate 62 formed by these facets are integral with the porous outer skin 60, alternatively on the faces 60A and 60B. The pitch, or distance, separating the two edges is a parameter of the present disclosure.

For making the cellular acoustic structure of the third form of the present disclosure, the facets forming the plate 62 are first integrated to the cells 64 and 65, then, the obtained assembly is bonded to the faces 60A and 60B of the outer skin 60.

The plate 62 may be formed by folds of polymerized glass or carbon.

Unlike the first two forms, an incident acoustic path from one side of the face 60A or of the face 60B travels through the cellular material at two levels and/or its median porous septum 61 at a variable height depending on the inlet point between two edges of the plate 62. Thus, an acoustic path 65 of inlet by the face 60B penetrates inside a cell 63 of the first level of cells 73, travels through the porous septum 61, then a fraction of the height of the cell 64 of the second level of cells 72. The acoustic path encounters then the reflection on the inclined facet facing the plate 62 to return back via the same path.

At the same level of the section of the cellular acoustic structure, but on the side of the face 60A, an incident acoustic path 66 enters into the cell 64 of the second level of cells 72 and immediately encounters the reflection on the inclined facet facing the plate 62.

At least in some cells, the acoustic path has a depth greater than half the thickness of the structure, and in some of these cells, such as those located on the right of edges 70-1 to 70-6 of the plate 62, the acoustic path is of full-thickness in the structure: The whole is qualified as acoustic filtering cell with two degrees of freedom "DDOF".

Figure 6:
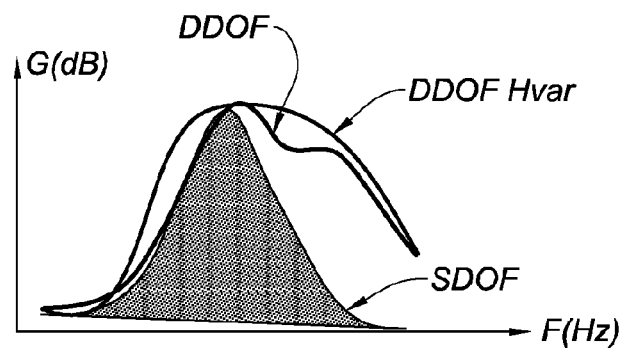
FIG. 6 is a graph showing a comparative acoustic efficiency of the three forms.

In FIG. 6, there is shown a graph showing the comparative acoustic efficiency of the three forms. The vertical axis carries the weakening gain in power (in dB) and the horizontal axis carries the frequencies of the acoustic wave in Hertz.

The characterization of the acoustic filtering of the second form (FIG. 4) is represented by the inner curve referenced SDOF, that of the first form (FIG. 3) is represented by the middle curve referenced DDOF and that of the third form (FIG. 5) is represented by the outer curve referenced DDOF HVAR. Note that the filtering spectrum is gradually widened between the second, then the first and finally the third form, and this extension acts especially at high frequencies.

The cellular acoustic structure that has been described in the three aforementioned forms may be applied to a radial separator of a turbojet engine as it has been exposed by applying a suitable airfoil to the chosen cellular acoustic structure. A turbojet engine equipped with such a radial separator (11, 13—FIG. 1) has a reduced acoustic emission.

In addition, the cellular acoustic structure that has been described in the three aforementioned forms may be applied to other types of turbojet engine pieces, among which the flow-straightening vanes such as OGVs (Outlet Guide Vane), provided that it receives a suitable airfoil.

What is claimed is:

1. A cellular acoustic structure for a turbojet engine comprising:
    a closed wall comprising at least two opposed external faces, each external face including acoustically transparent areas, the closed wall being filled with a plurality of cells between the at least two opposed faces; and
    acoustic reflection means, being disposed within the closed wall and between the at least two external opposed faces so that an acoustic path of aerial sound vibrations travels through said acoustically transparent areas, penetrates inside the cells and reflects on the acoustic reflection means, the acoustic path having in at least some of the cells a depth greater than a half of a thickness of the cellular acoustic structure.

2. The cellular acoustic structure according to claim 1, further comprising two levels of cellular material separated by a median porous septum, wherein the closed wall alternates the acoustically transparent areas and acoustically reflective areas, the acoustically reflective areas being disposed on one of said at least two faces, the acoustically transparent areas being disposed on other face of said two faces.

3. The cellular acoustic structure according to claim 1, further comprising a single level of cellular material, wherein the closed wall alternates the acoustically transparent areas and acoustically reflective areas, the acoustically reflective areas being disposed on a first face of said at least two faces, the acoustically transparent areas being disposed on a second face of the two faces.

4. The cellular acoustic structure according to claim 1, further comprising two levels of cellular material separated by a median porous septum, and a plate including a plurality of inclined facets which is acoustically reflective and connected by edges so that the acoustic path is made through the two levels of cellular material, and the median porous septum are of varying depths along a section of the cellular acoustic structure.

5. A turbojet engine incorporating at least one cellular acoustic structure according to claim 1.

6. The turbojet engine according to claim 5, wherein the cellular acoustic structure is provided with an airfoil to make a radial separator between a first envelope and a second envelope delimiting a cold flow.

7. The turbojet engine according to claim 5, wherein the cellular acoustic structure is provided with an airfoil to make at least one flow-straightening vane for a turbine generating cold flow propelled between a first envelope and a second envelope.

* * * * *